United States Patent
Heins et al.

(10) Patent No.: US 12,215,701 B2
(45) Date of Patent: Feb. 4, 2025

(54) SYSTEM AND METHOD FOR DETERMINING A CONDITION OF A FLUID FLOW PATH

(71) Applicants: Regal Beloit America, Inc., Beloit, WI (US); Regal Beloit Australia Pty Ltd, Rowville (AU); Changzhou Regal-Beloit Sinya Motor Co., LTD, Jiangsu (CN)

(72) Inventors: Greg Heins, Rowville (AU); Lyell Douglas Embery, Rowville (AU); Matthew J. Turner, Rowville (AU); Rafal Pawel Rohoza, Rowville (AU); Bin Chen, Jiangsu (CN); Hani Chahine, Rowville (AU); Mark Thiele, Rowville (AU)

(73) Assignee: Rexnord Australia Pty LTD, Sydney (AU)

( * ) Notice: Subject to any disclaimer, the term of this patent is extended or adjusted under 35 U.S.C. 154(b) by 387 days.

(21) Appl. No.: 15/266,729

(22) Filed: Sep. 15, 2016

(65) Prior Publication Data
US 2017/0077863 A1 Mar. 16, 2017

(30) Foreign Application Priority Data
Sep. 15, 2015 (CN) .......................... 201510696524.3

(51) Int. Cl.
*H02P 3/18* (2006.01)
*F04D 19/00* (2006.01)
(Continued)

(52) U.S. Cl.
CPC ......... *F04D 19/005* (2013.01); *F04D 27/008* (2013.01); *F05D 2270/335* (2013.01)

(58) Field of Classification Search
CPC .... G01R 19/2513; G01R 1/30; G01R 31/007; H02P 29/02; H02P 29/00; H02P 29/032;
(Continued)

(56) References Cited

U.S. PATENT DOCUMENTS 4,751,501 A 6/1988 Gut
4,978,896 A 12/1990 Shah
(Continued)

FOREIGN PATENT DOCUMENTS

CN 204063313 U 12/2014
CN 104632597 A 5/2015
(Continued)

OTHER PUBLICATIONS

Henk De Swardt—"Centrifugal fans direction of rotation explained", Vector, Jul. 2008, pp. 45-46, XP055346433 rom Internet: URL:http//www.ee.co.za/wp-content/uploads/legacy/Centrifugal.pdf.*
(Continued)

*Primary Examiner* — Kawing Chan
*Assistant Examiner* — Charles S Laughlin
(74) *Attorney, Agent, or Firm* — Armstrong Teasdale LLP

(57) ABSTRACT

A motor controller configured to be coupled to a motor that is coupled to a fan is described. The motor controller includes a processor coupled to a memory, and is configured to operate the motor in a first operating mode in which the motor rotates the fan in a first direction at a first speed. The motor controller is further configured to operate the motor in a restriction detection mode in which the motor rotates the fan in a second direction that is opposite the first direction, determine a torque associated with the motor while the motor is rotating the fan in the second direction, determine that the torque is not within a predefined threshold range in the memory, and determine that a restriction exists in a fluid flow path associated with the motor in response to deter-
(Continued)

mining that the torque is not within the predefined threshold range.

17 Claims, 4 Drawing Sheets

(51) Int. Cl.
*F04D 27/00* (2006.01)
*H02P 3/10* (2006.01)

(58) Field of Classification Search
CPC ......... H02P 3/18; H02P 6/06; H02P 29/0243;
H02P 21/22; H02P 27/08; H02P 6/14;
H02P 1/265; H02P 1/28; H02P 1/30;
H02P 2101/15; H02P 2207/03; H02P
2209/07; H02P 25/024; H02P 25/03;
H02P 25/08; H02P 25/184; H02P 27/04;
H02P 27/06; H02P 29/60; F04D 19/005
USPC ....... 318/490, 546, 431, 48, 400.07, 400.15,
318/400.21, 707
See application file for complete search history.

(56) References Cited

U.S. PATENT DOCUMENTS

| | | | |
|---|---|---|---|
| 7,941,294 B2 | 5/2011 | Shahi et al. | |
| 2005/0247194 A1* | 11/2005 | Kang | B01D 46/0086 95/19 |
| 2005/0280384 A1* | 12/2005 | Sulfstede | F04D 27/004 318/432 |
| 2008/0188173 A1* | 8/2008 | Chen | F24F 11/77 454/239 |
| 2009/0165644 A1* | 7/2009 | Campbell | B01D 46/0086 95/25 |
| 2010/0060228 A1* | 3/2010 | Woodward | H02P 1/04 318/400.09 |
| 2010/0256821 A1* | 10/2010 | Jeung | G05B 15/02 318/504 |
| 2012/0323374 A1* | 12/2012 | Dean-Hendricks | F24F 11/0012 700/276 |
| 2013/0334994 A1* | 12/2013 | Solan, Jr. | H02P 6/22 318/400.15 |
| 2015/0219109 A1* | 8/2015 | Suwa | F04D 27/001 318/431 |

FOREIGN PATENT DOCUMENTS

| | | | | |
|---|---|---|---|---|
| EP | 1800919 A2 | | 6/2007 | |
| JP | 1800919 A2 | * | 6/2007 | ......... B01D 46/0086 |
| WO | 1995008745 A1 | | 3/1995 | |
| WO | 20110069256 A1 | | 6/2011 | |
| WO | WO2011/069256 | * | 6/2011 | |
| WO | 2013058820 A1 | | 4/2013 | |
| WO | WO2013058820 | * | 4/2013 | |

OTHER PUBLICATIONS

European Extended Search Report Appln. No. 16188489.5-1806 dated Mar. 9, 2017, 15 pages.
Henk De Swardt—"Centrifugal fans direction of rotation explained", Vector, Jul. 2008, pp. 45-46, XP055346433 from Internet: URL:http//www.ee.co.za/wp-content/uploads/legacy/Centrifugal.pdf.
"Fan Performance Characteristics of Centrifugal Fans", 2000, XO055346149 from Internet: URL:http://www.tcf.com/docs/fan-engineering-letters/fan-performance-characteristics-of-centrifugal-fans-fe-2400.pdf.
Chinese language First Office Action dated Jul. 2, 2019, and English language translation, for related CN patent application No. 201510696524.3.

* cited by examiner

SYSTEM AND METHOD FOR DETERMINING A CONDITION OF A FLUID FLOW PATH

CROSS REFERENCE TO RELATED APPLICATIONS

This application claims priority to Chinese Patent Application No. 201510696524.3 filed Sep. 15, 2015, which is hereby incorporated by reference in its entirety.

BACKGROUND

The field of the disclosure relates generally to determining a condition of a fluid flow path, and more specifically to determining that a restriction exists in a fluid flow path.

Often it is desirable to detect the condition of a fluid flow path, such as a filter, piping or ductwork installation. This ability to determine the condition of the fluid flow path is beneficial for controlling the pressure and/or flow of fluid that is moved through the fluid flow path, and to estimate when maintenance is required. For some fan types, it is not possible to determine the condition of the fluid flow path, for example whether a restriction is present in the fluid flow path, from motor operating parameters when the motor is operating at its normal operating point. Rather, such systems require additional sensors, for example pressure sensors or flow sensors, to be installed in the fluid flow path, thereby adding to the cost of the overall system.

BRIEF DESCRIPTION

In one aspect, a motor controller is provided. The motor controller is configured to be coupled to a motor that is coupled to a fan. The motor controller includes a processor coupled to a memory and is configured to operate the motor in a first operating mode in which the motor rotates the fan at a first speed in a first direction that causes a fluid to move from an inlet of a fluid flow path to an outlet of the fluid flow path. The motor controller is further configured to operate the motor in a restriction detection mode in which the motor rotates the fan in a second direction that is opposite the first direction, determine a torque associated with the motor while the motor is rotating the fan in the second direction, determine that the torque is not within a predefined threshold range stored in the memory, and determine that a restriction exists in the fluid flow path in response to determining that the torque is not within the predefined threshold range.

In another aspect, a method for determining a condition of a fluid flow path is provided. The method is implemented by a motor controller that is configured to be coupled to a motor. The motor is coupled to a fan. The motor controller includes a processor coupled to a memory and is configured to operate the motor in a first operating mode in which the motor rotates the fan at a first speed in a first direction that causes a fluid to move from an inlet of the fluid flow path to an outlet of the fluid flow path. The method includes operating, by the motor controller, the motor in a restriction detection mode in which the motor rotates the fan in a second direction that is opposite the first direction. The method additionally includes determining, by the motor controller, a torque associated with the motor while the motor is rotating the fan in the second direction. Additionally, the method includes determining, by the motor controller, that the torque is not within a predefined threshold range stored in the memory. Further, the method includes determining, by the motor controller, that a restriction exists in the fluid flow path in response to determining that the torque is not within the predefined threshold range.

In another aspect, a non-transitory computer-readable storage medium having processor-executable instructions stored thereon is provided. The instructions are executed by a motor controller that is configured to be coupled to a motor that is coupled to a fan. The motor controller includes a processor coupled to a memory and is configured to operate the motor in a first operating mode in which the motor rotates the fan at a first speed in a first direction that causes a fluid to move from an inlet of a fluid flow path to an outlet of the fluid flow path. When executed by the motor controller, the instructions cause the motor controller to operate the motor in a restriction detection mode in which the motor rotates the fan at a second speed, determine a torque associated with the motor while the motor is rotating the fan at the second speed, determine that the torque is not within a predefined threshold range stored in the memory, and determine that a restriction exists in the fluid flow path in response to determining that the torque is not within the predefined threshold range.

DETAILED DESCRIPTION

Rather than relying on pressure sensors or flow sensors to detect the existence of a restriction in a fluid flow path, the systems and methods described herein enable a motor controller to detect the presence and severity of a restriction in the flow path based on operating parameters of the motor to which the motor controller is coupled. More specifically, the motor controller operates the motor in a restriction detection mode in which the motor reverses the rotation of the fan to which the motor is coupled and the motor controller determines, from the electrical current drawn by the motor, that the flow of fluid through the fluid flow path is restricted beyond a predefined threshold amount. In response, the motor controller causes a user interface component to indicate that maintenance should be performed and/or that a filter in the fluid flow path should be replaced or cleaned.

In one implementation, a computer program is described, and the program is embodied on a computer-readable medium. In an example implementation, the computer program is executed on a standalone computing device. The computer program is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Figure 1:
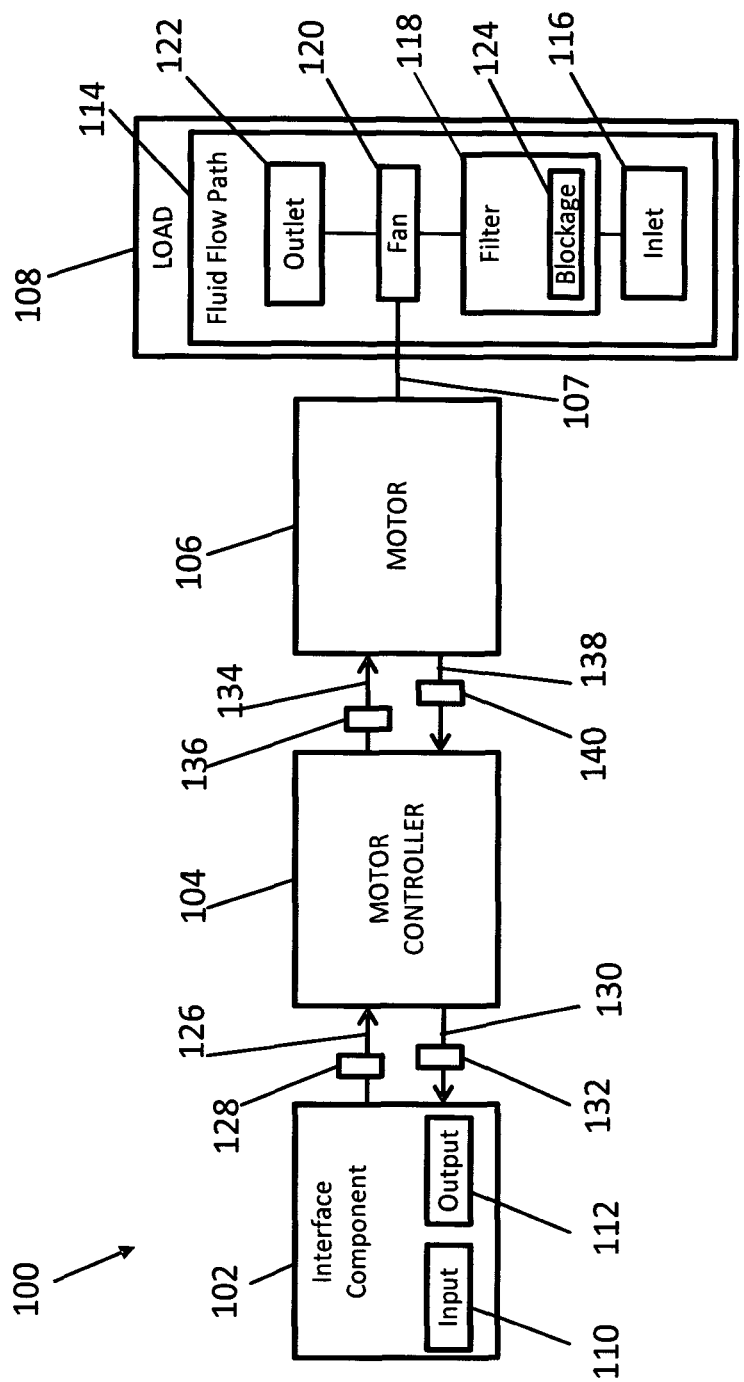
FIG. 1 is a block diagram of an example system that includes a motor controller coupled to a motor that moves a fluid through a fluid flow path.

FIG. 1 is a block diagram of an example system 100 that includes a motor controller 104 coupled to a motor 106 that moves a fluid (not shown) through a fluid flow path 114. Motor controller 104 is communicatively coupled to a user interface component 102 that receives user selections through an input device 110 and outputs information to a user through an output device 112, as described in more detail herein. In some implementations, user interface component 102 is incorporated into motor controller 104. Further, in some implementations, motor controller 104 is incorporated into motor 106. Motor 106, which is for example an electric motor, is coupled to a fan 120 by a shaft 107. More specifically, motor 106 rotates shaft 107 to drive a load 108. In some implementations, load 108 includes a fluid flow path 114 that includes an inlet 116, a filter 118, fan 120, and an outlet 122. As motor 106 rotates shaft 107, fan 120 moves a fluid (not shown) into inlet 116, through filter 118, and out through outlet 122. Some implementations do not include shaft 107, and motor 106 is directly coupled to fan 120. In some implementations, the system 100 includes valves or dampers whereby the system restriction is changed. These valves or dampers may change infrequently enough to be detected by a timed (daily) operation of motor 106 in a restriction detection mode. In some implementations, the change in the valves or dampers operates as a trigger for motor 106 to transition into the restriction detection mode. In some implementations, the fluid is air. In other implementations, the fluid is water. Accordingly, in some implementations, system 100 is an air moving system, such as a heating, ventilating, and air conditioning system (HVAC) and in other implementations, system 100 is a water pump, for example in a pool or spa. In at least some implementations, fan 120 is curved in a particular direction, for example forward or backwards, with respect to the direction of rotation. In other words, in at least some implementations, fan 120 is backward-curved, i.e., curved in a direction opposite the direction of normal rotation, or "forward rotation."

User interface component 102 transmits a selection signal 126 that includes a selection 128 to motor controller 104. Selection 128 includes, for example, (i) a selection to initialize (e.g., power on) motor controller 104 and motor 106, (ii) a selection to deactivate (e.g., power off) motor controller 104 and motor 106, (iii) a selection to operate motor 106 in first operating mode in which the fluid is moved through fluid flow path from inlet 116 to outlet 122, as described above, (iv) a selection to operate motor controller 104 and motor 106 in a restriction detection mode to that determines a condition of fluid flow path 114, and more specifically whether a restriction, such as a restriction 124 (e.g., a blockage) in filter 118 exists, or (v) a selection of a schedule for periodically operating in the restriction detection mode.

Motor controller 104 transmits a command signal 134 including a command 136 to motor 106. For example, in at least some implementations, command signal 134 includes command 136 to operate at a first speed in a first direction. In other implementations, command signal 134 includes command 136 to operate in a second direction at a second speed. In some implementations, the second speed is the same as the first speed. In some implementations, command signal 134 additionally includes electrical power required by motor 106 to rotate fan 120 at the commanded speed and direction.

As motor 106 operates at the commanded speed and direction, motor 106 transmits a feedback signal 138 including feedback 140. Feedback 140 includes information about the speed of motor 106 and the electrical current (hereinafter "current") used by motor 106 to operate at the speed. More specifically, in some implementations, the speed is a number of revolutions of motor 106 (i.e., of a rotor included in motor 106) within a predefined time period (e.g., one minute). In some implementations, motor 106 includes hall effect sensors (not shown) that detect cycles, such as changes in polarity, within motor 106. In some implementations, two cycles detected by the hall sensors correspond to one revolution. As described above, feedback 140 additionally includes information about the current used by motor 106 to operate at the speed. Motor controller 104 multiplies the current by a predefined value to determine the torque used by motor 106 at the speed. For some fans, for example forward-curved fans, the torque output by motor 106 increases as the pressure in fluid flow path 114 increases, when the forward-curved fan is moving the fluid from the inlet to the outlet.

If the fluid flow path 114 is restricted, for example by a blockage 124 in filter 118, the pressure in fluid flow path 114 is greater than it would otherwise be, and the current and torque associated with motor 106 is also greater than they would otherwise be. In other embodiments, the torque reduces as a result of increasing restrictions in fluid flow path 114. However, for a backward-curved fan (e.g., fan 120), the current and torque do not increase when a restriction is present in fluid flow path 114 and fan 120 is operating in the forward direction (e.g., rotating opposite a direction of curvature of the fan blades). Instead, to detect the presence and severity of restriction 124, motor controller 104 operates motor 106 in a restriction detection mode. In the restriction detection mode, motor 106 operates in a second direction ("reverse direction") that is opposite the forward direction. When operating in the reverse direction, the current and torque of motor increase in response to the increased pressure in fluid flow path 114. Motor controller 104 compares the torque and/or current to a predefined threshold range to determine if the torque and/or current is greater than or less than (i.e., not within) the predefined threshold range. If the torque and/or current is not within the predefined threshold range, then motor controller 104 determines that a restriction (e.g., restriction 124) exists in fluid flow path 114. Motor controller 104 transmits output signals 130 including output 132 to user interface component 102. For example, if motor controller 104 determines that restriction 124 exists in fluid flow path and/or that the restriction 124 is of a predefined magnitude or severity, then motor controller 104 transmits output signal 130 including output 132 indicating that the restriction exists, that maintenance must be performed, and/or that filter 118 should be changed or cleaned.

Figure 2:
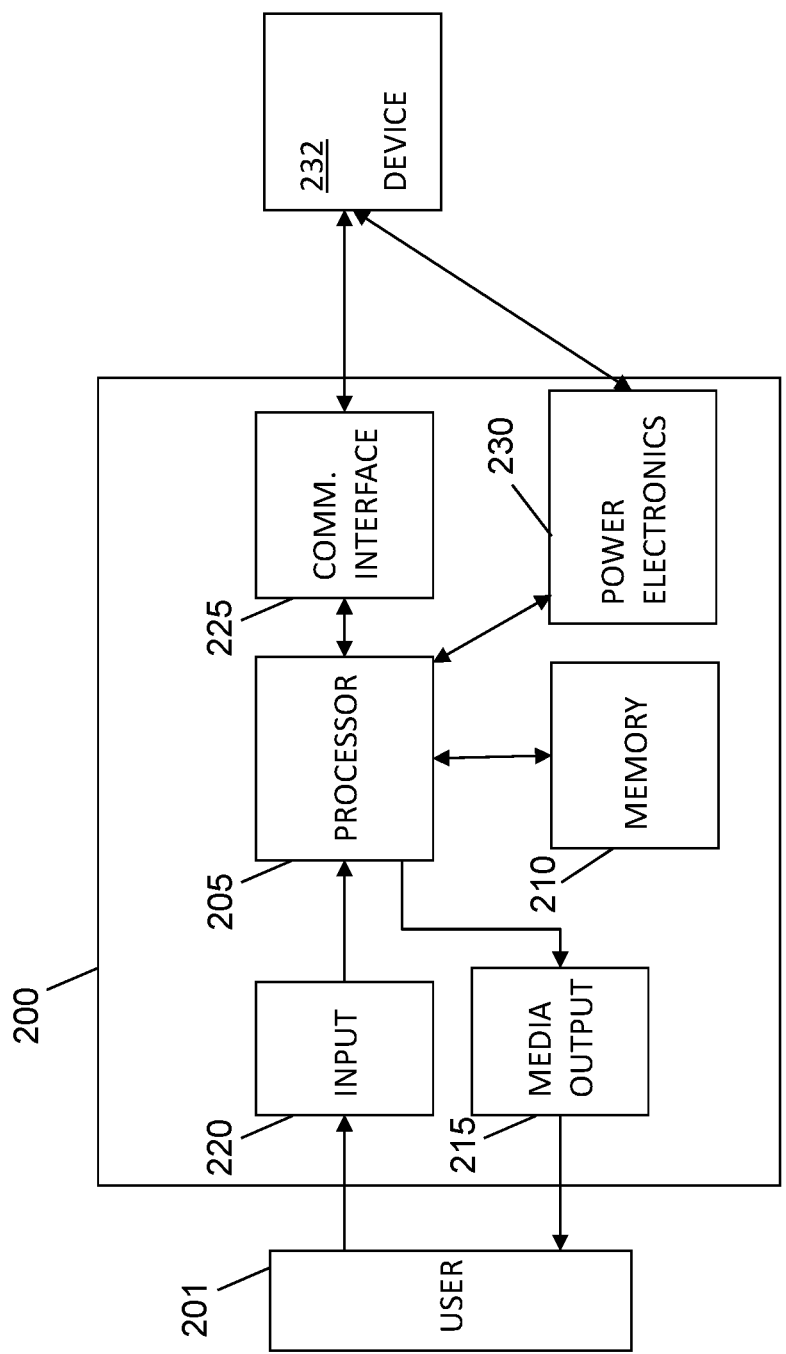
FIG. 2 is a block diagram of an example computing device included in the system of FIG. 1.

FIG. 2 is a block diagram of an example computing device 200. At least some components of computing device 200 are included in implementations of other devices describe herein, for example user interface component 102 and motor controller 104. Computing device 200 includes a processor 205 for executing instructions. In some implementations, executable instructions are stored in a memory area 210. Processor 205 may include one or more processing units (e.g., in a multi-core configuration). Memory area 210 is any device allowing information such as executable instructions and/or other data to be stored and retrieved. Memory area 210 may include one or more computer-readable media.

In some implementations, computing device 200 also includes at least one media output component 215 for presenting information to user 201. Media output component 215 is any component capable of conveying information to user 201. Output device 112 (shown in FIG. 1) is an example of media output component 215. In some implementations, media output component 215 includes an output adapter such as a video adapter and/or an audio adapter. An output adapter is operatively coupled to processor 205 and operatively couplable to an output device such as a display device (e.g., a liquid crystal display (LCD), one or more light emitting diodes (LED), an organic light emitting diode (OLED) display, cathode ray tube (CRT), or "electronic ink" display) or an audio output device (e.g., a speaker or headphones).

In some implementations, computing device 200 includes an input device 220 for receiving input from user 201. Input device 110 (shown in FIG. 1) is an example of input device 220. Input device 220 may include, for example, one or more buttons, a keypad, a touch sensitive panel (e.g., a touch pad or a touch screen), and/or a microphone. A single component such as a touch screen may function as both an output device of media output component 215 and input device 220.

Computing device 200 may also include a communication interface 225, which is communicatively couplable to another device 232, for example user interface component 102, motor controller 104, motor 106, or another device. In some implementations, communication interface 225 is configured to enable communication through a short range wireless communication protocol such as near field communication (NFC), Bluetooth™ or Z-Wave™, through a wireless local area network (WLAN) implemented pursuant to an IEEE (Institute of Electrical and Electronics Engineers) 802.11 standard (i.e., WiFi), and/or through a mobile phone (i.e., cellular) network (e.g., Global System for Mobile communications (GSM), 3G, 4G) or other mobile data network (e.g., Worldwide Interoperability for Microwave Access (WIMAX)), or a wired connection (i.e., one or more conductors for transmitting electrical signals). In some implementations, communication interface 225 includes, for example, one or more conductors for transmitting electrical signals and/or power to and/or from another device 232. Additionally, computing device 200 may also include power electronics 230 which may be coupled, for example, to processor 205 and motor 106.

Figure 3:
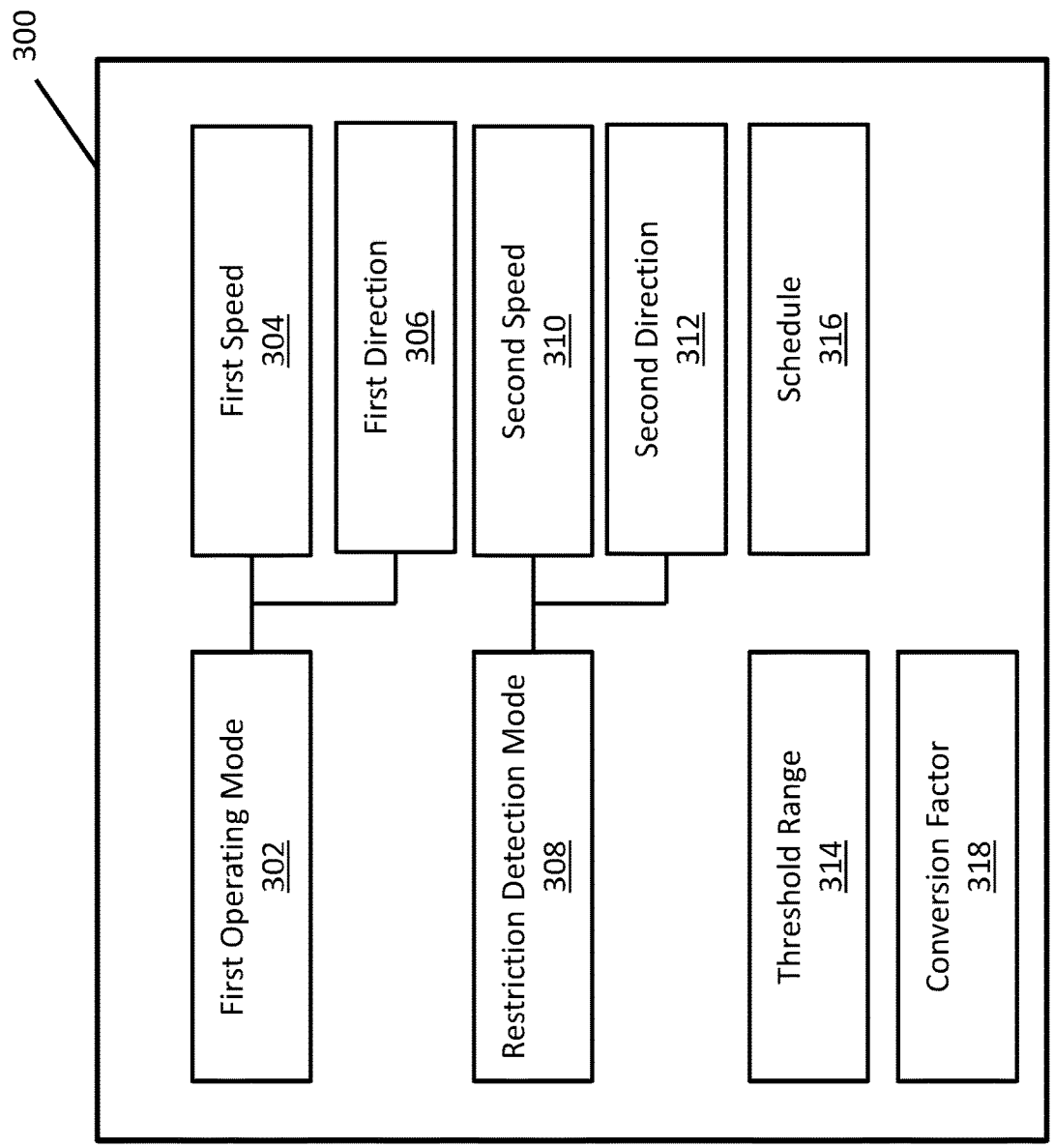
FIG. 3 is a diagram of data stored in a memory of the motor controller shown in FIG. 1.

FIG. 3 is a diagram of data 300 stored in a memory (e.g., memory 210) of motor controller 104. Data 300 includes settings associated with a first operating mode 302. More specifically, data 300 includes a first speed 304 and a first direction 306 for operating motor 106 in first operating mode 302. First direction 306 is a forward direction. Additionally, data 300 includes settings associated with a restriction detection mode 308. More specifically, data 300 includes a second speed 310 and a second direction 312 for operating motor 106 in restriction detection mode 308. Second direction 312 is a reverse direction, opposite the first, forward direction. In some implementations, second speed 310 is equal to first speed 304. In other implementations, second speed 310 is different than first speed 304.

Further, in some implementations, one or more of first speed 304 and second speed 310 are a range of speeds. Data 300 additionally includes a predefined threshold range 314 of torque values that motor controller compares the torque of motor to in order to detect the presence and severity of a restriction (e.g., restriction 124) in fluid flow path 114. Additionally, data 300 includes a schedule 316 that defines an interval or dates and times when motor controller 104 is to operate motor 106 in restriction detection mode 308. Schedule 316 may be preprogrammed into motor controller 104 by a manufacturer or entered by a user (e.g., user 201) through user interface component 102. Additionally, data 300 includes a conversion factor 318 that motor controller 104 multiplies the current (i.e., indicated in feedback 140) by in order to determine the torque generated by motor 106 when rotating fan 120 at a given speed (e.g., second speed 310).

Figure 4:
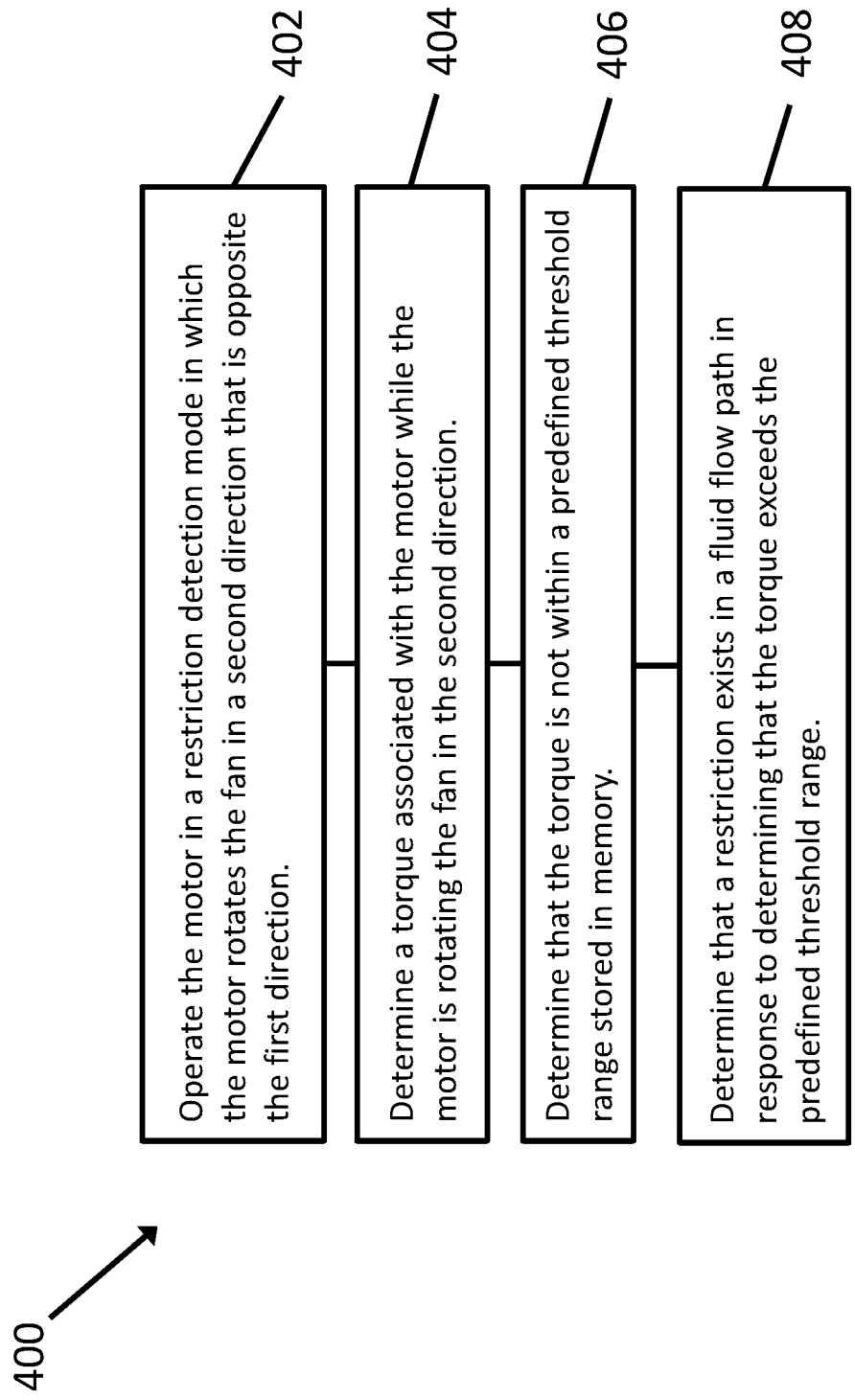
FIG. 4 a flowchart of a process performed by the motor controller for determining that a restriction exists in the fluid flow path shown in FIG. 1.

FIG. 4 is a flowchart of a process 400 performed by motor controller 104 for determining that a restriction exists in fluid flow path 114. Initially, motor controller 104 operates 402 motor 106 in a restriction detection mode (e.g., restriction detection mode 308) in which motor 106 rotates fan 120 in second direction 312, which is opposite first direction 306. More specifically, second direction 312 is the direction that fan 120 must be rotated to move fluid from outlet 122 to inlet 116. Additionally, motor controller 104 determines 404 a torque associated with motor 106 while the motor 106 is rotating fan 120 in second direction 312. Further, motor controller 104 determines 406 that the torque is not within (e.g., greater than or less than) a predefined threshold range (e.g., threshold range 314) stored in memory (e.g., memory 210). Additionally, motor controller 104 determines 408 that a restriction (e.g., restriction 124) exists in a fluid flow path (e.g., fluid flow path 114) associated with the motor 106 in response to determining that the torque is not within the predefined threshold range 314.

In some implementations, motor controller 104 operates motor 106 at first speed 304 in the restriction detection mode 308. More specifically, in such implementations, first speed 304 and second speed 310 are equal. In some embodiments, motor controller 104 transmits, to user interface component 102, an indication (e.g. output 132 in output signal 130) that a restriction (e.g., restriction 124) in fluid flow path 114 has been detected. In some implementations, motor controller 104 receives a signal (e.g., selection signal 126) from user interface component 102 to activate restriction detection mode 308 and motor controller 104 operates motor 106 in restriction detection mode 308 in response to receiving the signal (e.g., selection signal 126). In some embodiments, motor controller 104 operates motor 106 in restriction detection mode 308 during an initialization phase of motor controller 104, for example upon being activated or upon receiving power. In some implementations, motor controller 104 receives a signal (e.g., selection signal 126) from user interface component 102 to deactivate motor 106. Motor controller 104 operates motor 106 in restriction detection mode 308 in response to receiving the signal (e.g., selection signal 126) from user interface component 102 and deactivates motor 106 after operating motor 106 in restriction detection mode 308. For example, motor controller 104 operates motor 106 in restriction detection mode 308 for a predetermined time period (e.g., 30 seconds). In some implementations, motor controller 104 stores a schedule (e.g., schedule 316) for the restriction detection mode in memory (e.g., memory 210) and operates motor 106 in restriction detection mode 308 in accordance with the schedule (e.g., schedule 316). In some implementations, motor controller 104 determines the torque by sensing a current (e.g., represented in feedback 140) that is used by motor 106 to operate fan 120 in second direction 312 at the first speed (e.g., first speed 304), and multiplies the current by a predefined conversion factor (e.g., conversion factor 318).

In some implementations, motor controller 104 causes motor 106 to operate in restriction detection mode 308 by operating motor 106 outside of a normal operating point. For example, in some implementations, second speed is different (i.e., greater or less) than first speed 304 and rather than operating motor 106 in the second direction 312, motor 106 operates in first direction 306 at second speed 310.

The methods and systems described herein may be implemented using computer programming or engineering techniques including computer software, firmware, hardware or any combination or subset thereof, wherein the technical effect may include at least one of: (a) operating a motor in a restriction detection mode in which the motor rotates a fan in a second direction that is opposite a first direction; (b) determining a torque associated with the motor while the motor is rotating the fan in the second direction; (c) determining that the torque is not within a predefined threshold range stored in the memory; and (d) determining that a restriction exists in a fluid flow path associated with the motor in response to determining that the torque is not within the predefined threshold range.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 205, including RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

As compared to known systems and methods detecting and characterizing a restriction in a fluid flow path, the systems and methods described herein enable a motor controller to detect the presence and severity of a restriction in a fluid flow path for a fan that is curved away from the normal direction of flow, without requiring pressure or flow sensors. Accordingly, the overall cost of the system can be reduced without eliminating the ability to detect and characterize a restriction in a fluid flow path.

Exemplary embodiments of systems and methods for communicating data with a motor controller are described herein. The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A motor controller configured to be coupled to a motor that is coupled to a backward-curved fan, said motor controller comprising a processor coupled to a memory, said motor controller is configured to:

operate the motor to rotate the backward-curved fan at a first speed in a forward direction that causes a fluid to move from an inlet of a fluid flow path to an outlet of the fluid flow path, wherein the backward-curved fan is curved backward with respect to a direction of movement of the fluid through the fluid flow path, and wherein restriction of the fluid flow path does not increase a torque associated with the motor while operating in the forward direction;

store a schedule for a restriction detection mode in said memory, the schedule defining times when the motor is to be operated in the restriction detection mode;

operate, in accordance with the schedule, the motor to rotate the backward-curved fan in a reverse direction that is opposite the forward direction, wherein restriction of the fluid flow path increases the torque associated with the motor while operating in the reverse direction;

determine the torque associated with the motor while the motor is rotating the backward-curved fan only in the reverse direction during the restriction detection mode;

determine that the torque is not within a predefined threshold range stored in said memory, the predefined threshold range indicating an expected range of torque for resulting from the backward-curved fan to operate operating in the reverse direction when no restriction is present in the fluid flow path; and determine that a restriction exists in the fluid flow path in response to determining that the torque is not within the predefined threshold range.

2. The motor controller of claim 1, further configured to operate the motor at the first speed in the restriction detection mode.

3. The motor controller of claim 1, wherein said motor controller is coupled to a user interface component, said motor controller is further configured to transmit, to the user interface component, an indication that a restriction in the fluid flow path has been detected.

4. The motor controller of claim 1, wherein said motor controller is coupled to a user interface component, said motor controller is further configured to:
receive a signal from the user interface component to activate the restriction detection mode; and
operate the motor in the restriction detection mode in response to receiving the signal.

5. The motor controller of claim 1, further configured to operate the motor in the restriction detection mode during an initialization phase of the motor controller.

6. The motor controller of claim 1, wherein said motor controller is coupled to a user interface component, said motor controller is further configured to:
receive a signal from the user interface component to deactivate the motor;
operate the motor in the restriction detection mode in response to receiving the signal from the user interface component; and
deactivate the motor after operating the motor in the restriction detection mode.

7. The motor controller of claim 1, further configured to determine the torque by:
sensing a current that is used by the motor to operate the backward-curved fan in the reverse direction at the first speed; and
multiply the current by a predefined conversion factor.

8. A method for determining a condition of a fluid flow path, said method is implemented by a motor controller that is configured to be coupled to a motor that is coupled to a backward-curved fan, the motor controller includes a processor coupled to a memory, said method comprising:
operating, by the motor controller, the motor to rotate the backward-curved fan at a first speed in a forward direction that causes a fluid to move from an inlet of a fluid flow path to an outlet of the fluid flow path, wherein the backward-curved fan is curved backward with respect to a direction of movement of the fluid through the fluid flow path, and wherein restriction of the fluid flow path does not increase a torque associated with the motor while operating in the forward direction;
storing, by the motor controller, a schedule for a restriction detection mode in the memory, the schedule defining times when the motor is to be operated in the restriction detection mode;
operating, by the motor controller, in accordance with the schedule, the motor to rotate the backward-curved fan in a reverse direction that is opposite the forward directions wherein restriction of the fluid flow path increases the torque associated with the motor while operating in the reverse direction;
determining, by the motor controller, the torque associated with the motor while the motor is rotating the backward-curved fan only in the reverse direction during the restriction detection mode;
determining, by the motor controller, that the torque is not within a predefined threshold range stored in the memory, the predefined threshold range indicating an expected range of torque for resulting from the backward-curved fan to operate operating in the reverse direction when no restriction or an acceptable restriction is present in the fluid flow path; and determining, by the motor controller, that a an unacceptable restriction exists in a fluid flow path in response to determining that the torque is not within the predefined threshold range.

9. The method of claim 8, further comprising operating the motor at the first speed in the restriction detection mode.

10. The method of claim 8, wherein the motor controller is coupled to a user interface component, said method further comprising transmitting, to the user interface component, an indication that a restriction in the fluid flow path has been detected.

11. The method of claim 8, wherein the motor controller is coupled to a user interface component, said method further comprising:
receiving a signal from the user interface component to activate the restriction detection mode; and
operating the motor in the restriction detection mode in response to receiving the signal.

12. The method of claim 8, further comprising operating the motor in the restriction detection mode during an initialization phase of the motor controller.

13. The method of claim 8, wherein the motor controller is coupled to a user interface component, said method further comprising:
receiving a signal from the user interface component to deactivate the motor;
operating the motor in the restriction detection mode in response to receiving the signal from the user interface component; and
deactivating the motor after operating the motor in the restriction detection mode.

14. The method of claim 8, further comprising determining the torque by:
sensing a current that is used by the motor to operate the backward-curved fan in the reverse direction at the first speed; and
multiply the current by a predefined conversion factor.

15. A non-transitory computer-readable storage medium having processor-executable instructions stored thereon, wherein when executed by a motor controller that is configured to be coupled to a motor and is coupled to a backward-curved fan, wherein the motor controller includes a processor coupled to a memory, said instructions cause the motor controller to:
operate the motor to rotate the backward-curved fan at a first speed in a forward direction that causes a fluid to move from an inlet of a fluid flow path to an outlet of the fluid flow path,
wherein the backward-curved fan is curved backward with respect to a direction of movement of the fluid through the fluid flow path, and wherein restriction of the fluid flow path does not increase a torque associated with the motor while operating in the forward direction;
store a schedule for a restriction detection mode in the memory, the schedule defining times when the motor is to be operated in the restriction detection mode;
operate, in accordance with the schedule, the motor to rotate the backward-curved fan at a second speed in a reverse direction opposite the forward direction, wherein restriction of the fluid flow path increases the torque associated with the motor while operating in the reverse direction;

determine the torque associated with the motor while the motor is rotating the backward-curved fan at the second speed only in the reverse direction during the restriction detection mode;

determine that the torque is not within a predefined threshold range stored in the memory, the predefined threshold range indicating an expected range of torque for resulting from the backward-curved fan to operate operating in the reverse direction when no restriction is present in the fluid flow path; and determine that a restriction exists in the fluid flow path in response to determining that the torque is not within the predefined threshold range.

16. The non-transitory computer-readable storage medium of claim 15, wherein the motor controller is coupled to a user interface component, said instructions additionally cause the motor controller to transmit, to the user interface component, an indication that a restriction in the fluid flow path has been detected.

17. The non-transitory computer-readable storage medium of claim 15, wherein the motor controller is coupled to a user interface component, and said instructions additionally cause the motor controller to:

receive a signal from the user interface component to activate the restriction detection mode; and operate the motor in the restriction detection mode in response to receiving the signal.

\* \* \* \* \*